July 14, 1931.  W. F. WINSTEAD  1,814,996
TRACTOR
Filed Nov. 3, 1930  5 Sheets-Sheet 1

INVENTOR.
William F. Winstead
BY
John B. Brady
ATTORNEY

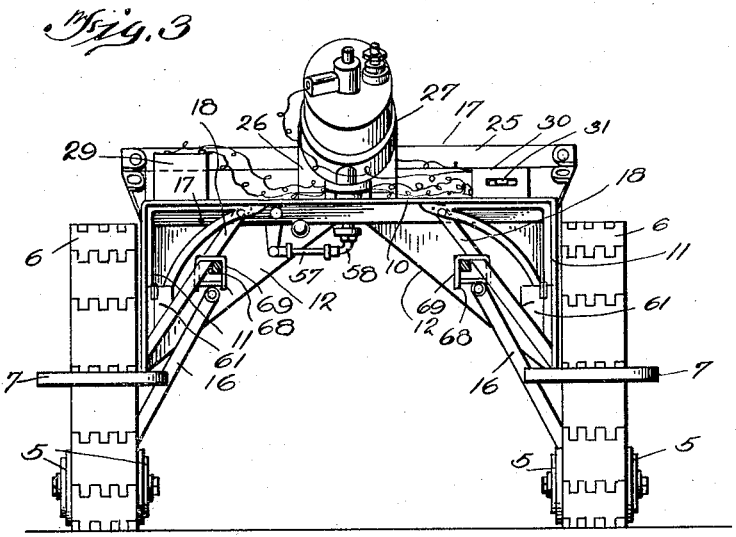
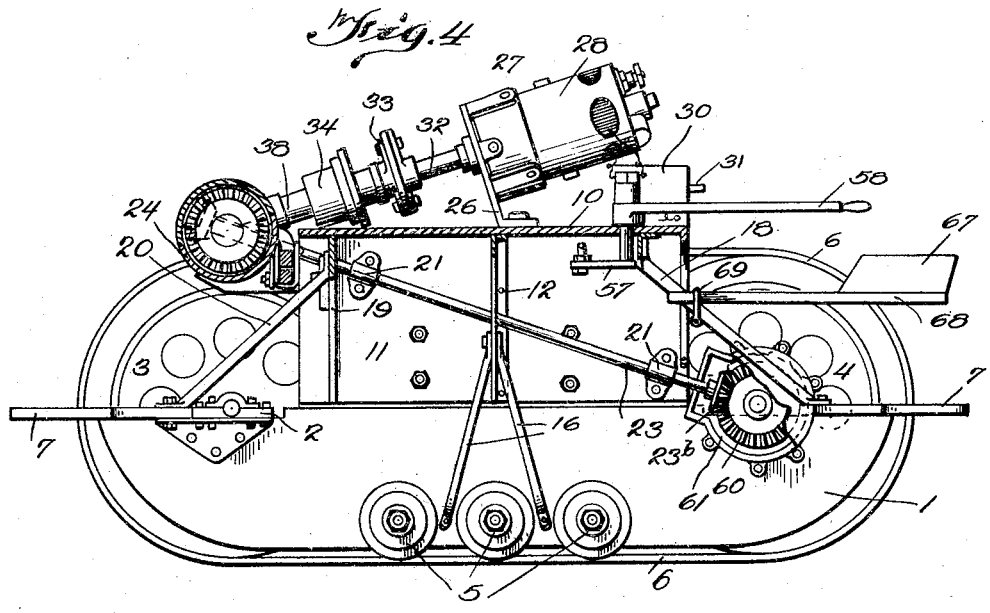

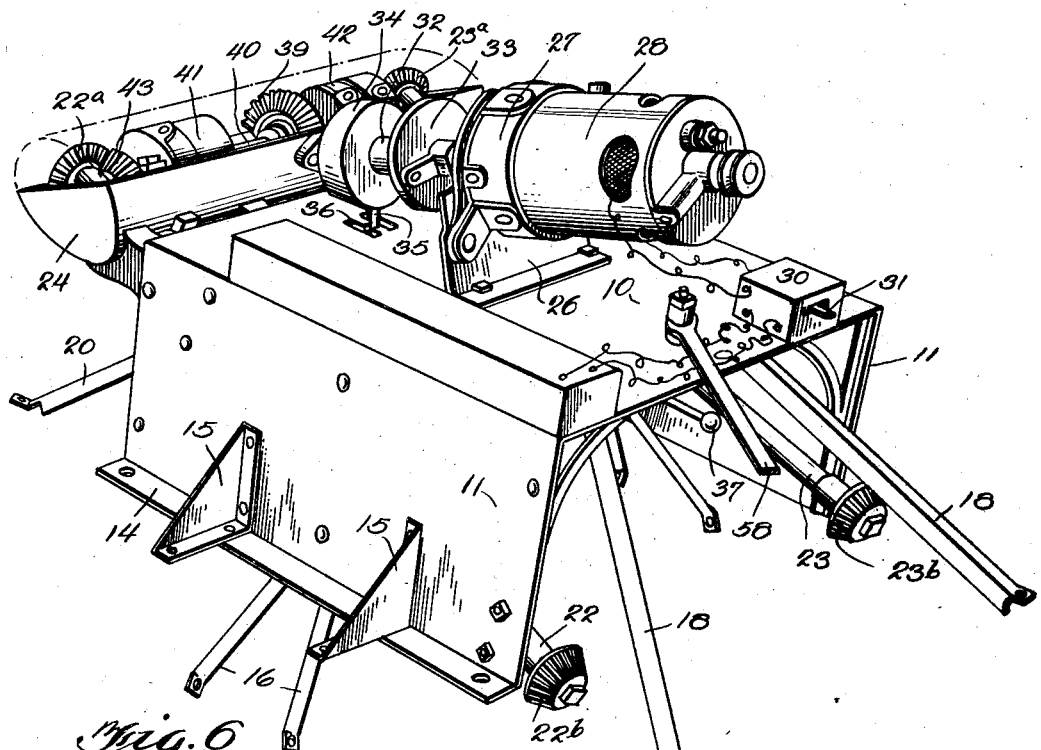

July 14, 1931. W. F. WINSTEAD 1,814,996
TRACTOR
Filed Nov. 3, 1930 5 Sheets-Sheet 4
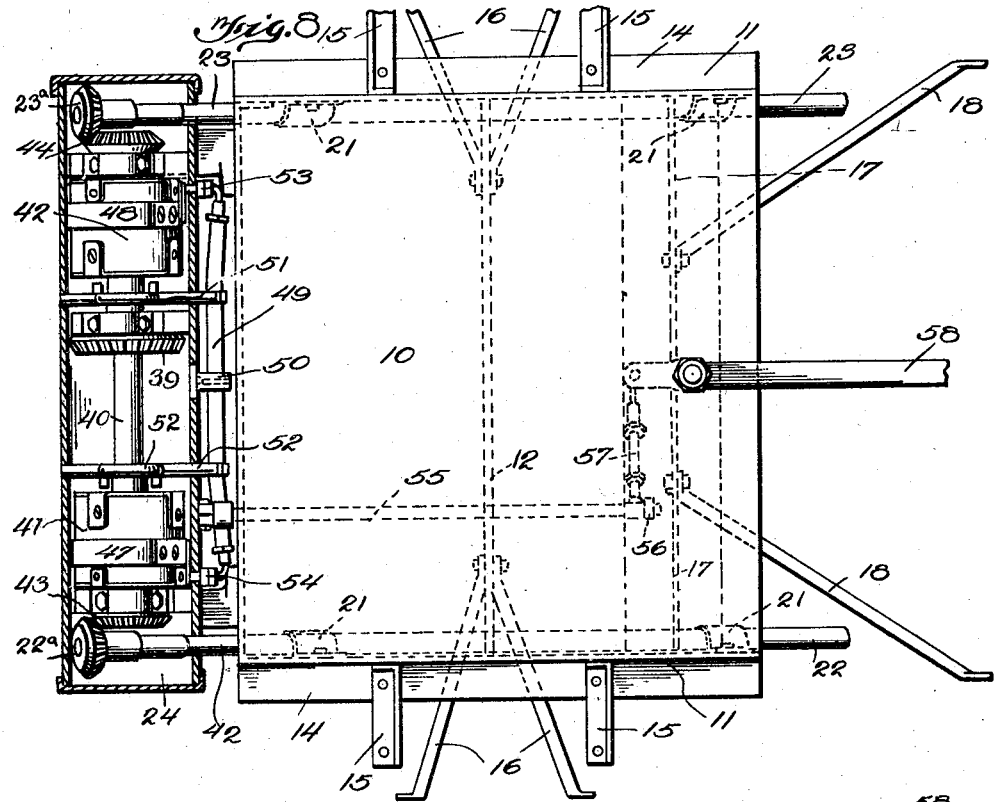
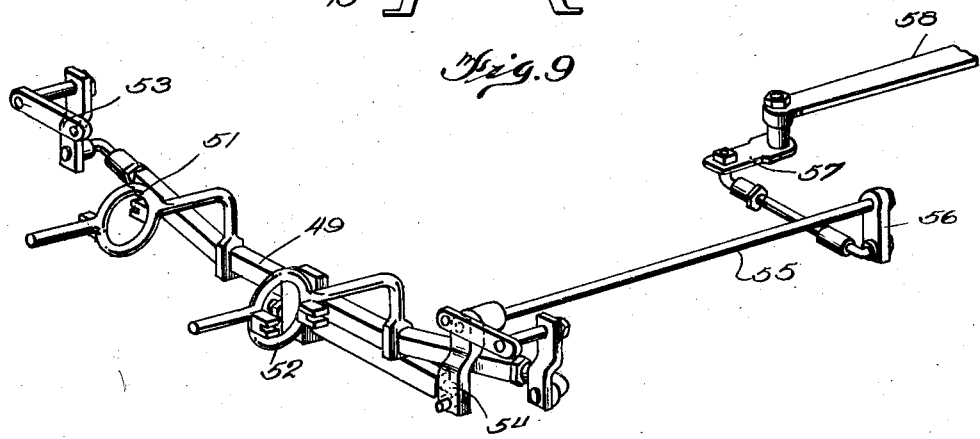
INVENTOR.
William F. Winstead
BY
John B. Brody
ATTORNEY July 14, 1931.  W. F. WINSTEAD  1,814,996
TRACTOR
Filed Nov. 3, 1930  5 Sheets-Sheet 5
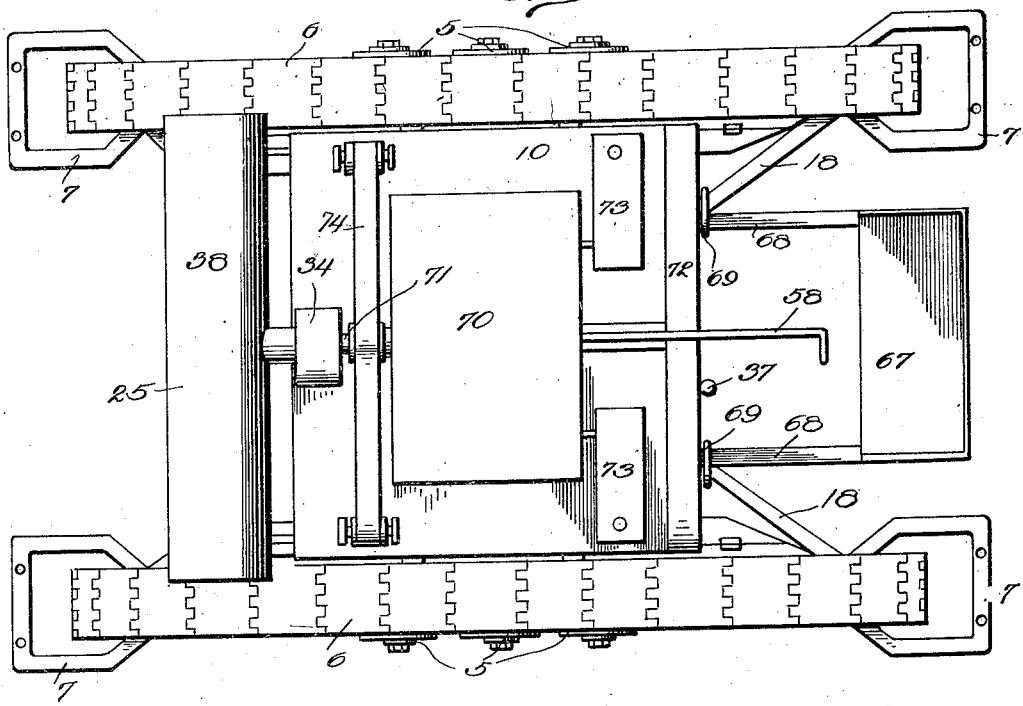
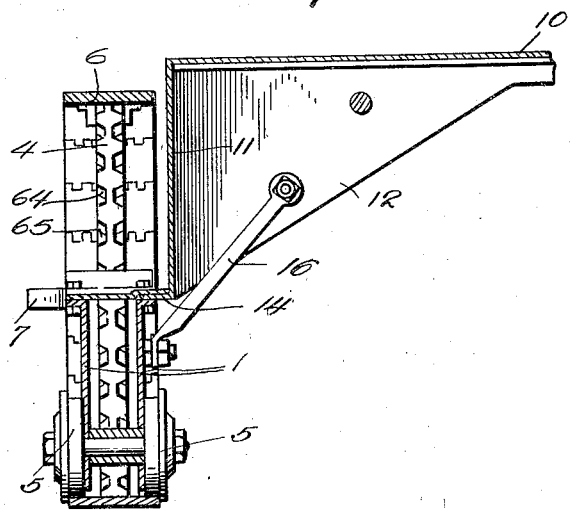
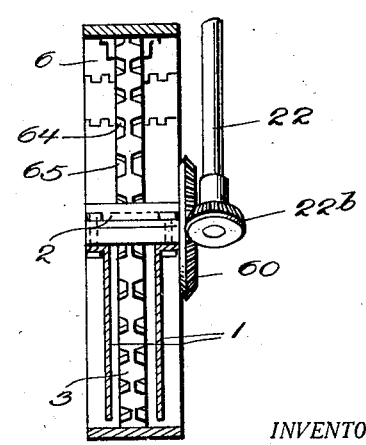
INVENTOR.
William F. Winstead
BY
John C. Brady
ATTORNEY.

Patented July 14, 1931

1,814,996

UNITED STATES PATENT OFFICE

WILLIAM F. WINSTEAD, OF NEW ORLEANS, LOUISIANA

TRACTOR

Application filed November 3, 1930. Serial No. 493,173.

My invention relates broadly to cultivators and more particularly to a simplified construction of cultivator which may be equipped with a gas engine or electric drive with the control mechanism compactly assembled with respect to the parts of the cultivator.

One of the objects of my invention is to provide a construction of cultivator wherein the drive mechanism and control for the drive mechanism are mounted in such manner as to provide substantial clearance over rows of plants, the mechanism and controls being carried upon a metallic saddle adapted to straddle the rows along which the cultivator operates.

Another object of my invention is to provide a construction of farm tractor having the drive mechanism therefor supported upon a saddle extending laterally of the tractor and adapted to elevate the drive mechanism and controls out of the path of rows of vegetation along which the cultivator operates in the field.

A further object of my invention is to provide a construction of farm tractor having a sheet metal saddle supported between the side frames of the tractor where the saddle provides a mounting for all of the control and the driving mechanism for the tractor, raising the driving and control mechanism above the seater of the tractor so that the tractor straddles the rows along which the tractor operates.

Other and further objects of my invention reside in the compact assembly of parts and the inter-engagement and mounting of such parts as set forth more fully in the specification hereinafter following by reference to the accompanying drawings, wherein:

Figure 1 is a side elevation of the tractor forming part of the cultivator of my invention showing an electric drive mechanism mounted on the saddle thereof; Fig. 2 is a plan view of the cultivator shown in Fig. 1; Fig. 3 is a rear view of the cultivator shown in Figs. 1 and 2; Fig. 4 is a view of the tractor with certain parts shown in cross-section to illustrate more fully one form of gear drive employed for the tractor of my invention; Fig. 5 is a perspective view of the saddle which supports the drive mechanism and the control mechanism in the tractor of my invention showing the gear casing open to more fully illustrate the location of the control gearing and clutches therein; Figs. 6 and 7 show forms of worm gear drives for the tractor of my invention in lieu of the gearing illustrated in Fig. 4; Fig. 8 is a plan view illustrating the arrangement of drive gear and control therefor which is carried by the saddle on the tractor of my invention; Fig. 9 is a perspective view of the clutch actuating mechanism employed in the tractor of my invention; Fig. 10 illustrates a modified form of drive for the tractor of my invention employing a gas engine propulsion; and Figs. 11 and 12 show details of the traction drive for the tractor of my invention.

In the tractor construction of my invention, I provide a construction of saddle arranged to connect the crawler frames together and give high clearance for the drive mechanism and control therefor so that the cultivator can straddle plants and vegetation such as cotton and cane rows. The cultivator of my invention may have a clearance of the order of twenty-four inches, forty-eight inches, or more if required for the cultivation of various kinds of plants. The saddle is constructed from sheet metal and provides a support for the drive mechanism which may be an electric motor or a gasoline engine. The saddle provides a mount for the actuating gearing and control mechanism therefor. The saddle also provides a support for the mounting of an adjustable seat so that the seat may be raised from time to time as the plants grow higher. The operator can run the cultivator from either end of the tractor by reversing the parts of the drive mechanism and reversing the position of the operator's seat. The parts of the tractor are very readily assembled and inasmuch as the drive mechanism and parts are considerably reduced in number the cost of the tractor is very small for the work which the machine is capable of performing.

Referring to the drawings in detail, reference character 1 designates one of the side crawler frames of the tractor which carries the journals 2 adjacent opposite ends thereof in which the sprocket wheels 3 and 4 are rotatably mounted. Crawler track wheels 5 are mounted on each of the side frames 1 and serve to retain the crawler tracks 6 in position. In order to further assist in maintaining the crawler tracks in position and provide attachments for tools or other driving apparatus, I provide draw bars shown at 7 at each end of the tractor secured to the side frames 1 and encircling the crawler tracks 6 as shown. The saddle which supports the drive mechanism and the control mechanism of my invention is shown at 10 comprising a laterally extending portion and downwardly depending side portions 11 which are braced by angular members 12 and which have laterally extending side flanges 14 thereon. Laterally projecting angle members 15 are secured to the depending side portions 11 and engage the side frames 1 thereby suspending the saddle 10 intermediate the crawler frames 1. In order to strengthen the support between the saddle 10 and the side frames 1 of the tractor, I provide sets of brace rods 16 extending between the angle reinforcing members 12 and the side frame 1 of the tractor. The saddle is further strengthened by angle members interiorly positioned at 17 from which there extends additional braces 18 connecting to parts of the side frames 1. The saddle is also braced by a laterally extending portion 19 from which there extends braces 20 fastening to the side frames 1 adjacent the connection with drawbars 7 thereto. Interior side walls 11 of the saddle are each provided with journaled members 21 for mounting the drive shafts 22 and 23 on each side of the tractor. The drive shafts are angularly disposed and enter the gear housing 24 adjacent their upper extremities and are provided with gears adjacent their lower extremities which mesh with the gears on the driving sprockets of the tractor. The gear housing 24 is provided with a separable cover 25 which in Fig. 5 is removed to show the arrangement of clutch mechanism and drive gear. The saddle 10 has a mounting bracket 26 projecting upwardly therefrom on which there is supported a collar on socket member 27 which telescopically receives the electric motor 28. The electric motor 28 is energized from storage batteries which I have designated generally at 29 carried by the saddle 10 from which leads extend to the control box 30 and thence to the motor 28. Switch lever 31 extending from control box 30 governs the on and off and variable speed condition of motor 28. The shaft 32 of drive motor 28 extends through flexible coupling 33 to the transmission gear box 34. A gear shift lever 35 extends out from the transmission and through the H-shaped slot 36 in saddle 10 to the operating position shown at 37 for shifting of the gearing. Various speeds can be obtained by movement of the control shaft 37 to different positions. The driving shaft 38 which extends from the transmission 34 projects through the gear housing 24 and carries a gear thereon meshing with drive gear 39 on drive shaft 40.

While I have illustrated a bevel gear at 39, meshing with a bevel gear on the drive shaft 38 it will be understood that a worm gear may be employed as illustrated in Fig. 7 at 45 meshing with a spiral gear 46 on shaft 40. The shaft 40 extends into clutch housing 41 and 42 from which there projects stub shafts carrying bevel gears 43 and 44 respectively. The bevel gears 43 and 44 drive bevel gears 22a and 23a on drive shafts 24 and 23 respectively. Each clutch housing 41 and 42 is provided with a brake band 47 and 48. A control rod for effecting a disengagement of one clutch and an engagement of the opposite clutch for differentially driving the shafts 22 or 23 is indicated at 49.

I have shown the arrangement of the clutch and brake control operated from rod 49 as indicated in Fig. 9. Rod member 49 is shiftable laterally through support 50 for moving clutch collars 51 and 52 for the engagement or disengagement of clutches 42 and 41 respectively while simultaneously controlling the movement of the brake bands 48 and 47 respectively by lever mechanism designated at 53 and 54. Control rod 55 extends beneath the saddle 10 and connects with lever 56 and through link 57 to angularly shiftable lever 58. By shifting lever 58 laterally in either direction the power may be thrown from one drive shaft to the other. That is, with the lever 58 in neutral position drive shaft 38 supplies power through clutches 41 and 42 to drive shafts 22 and 23, while angular movement of lever 58 to the right transmits power from drive shaft 38 through shaft 40 to gear 43 and through gear 22a to drive shaft 22 while disengaging clutch 42 and applying brake band 48. Upon restoring lever 58 to neutral position the brake bands 47 and 48 are released and both clutches 41 and 42 are engaged for driving the shafts 22 and 23 equally. Upon shifting lever 58 to the left, clutch 41 is disengaged and the brake 47 applied thereto while clutch 42 is engaged and brake 48 is released for driving gear 44 in mesh with gear 23a and driving shaft 23. The shafts 22 and 23 carry gears 22b and 23b at their lower extremities which mesh with suitable gears such as 60 on the drive sprockets 3. The gears are encased in gear boxes shown at 61.

While I have illustrated bevel gears in Figs. 1, 2, 4 and 5 for driving the drive sprockets, I may utilize worm gearing as shown in Fig. 6 where the worm 62 is carried by shaft 23 and meshes with spiral gear 63 connected with drive sprocket 4.

In order to prevent rapid wear of the drive sprockets I provide a double set of grooves in the drive sprockets. When one set of grooves is undersize due to wear the chain teeth may be shifted into them in the course of the wear. That is to say, the drive sprocket 4 and the driven sprocket 3 are each provided with radial grooves or slots in the periphery thereof as shown in Fig. 1. Alternate slots or grooves are deeper than other alternate slots or grooves. One set of slots or grooves have been shown at 64 and alternate grooves of less depth are indicated at 65 enabling the inwardly projecting teeth 66 of the tractor chains 6 to be shifted into the grooves to secure the best tractive effort.

The operator's seat is adjustably positioned as shown at 67. The seat is carried by rod members 68 which are anchored at selected positions along brace members 18 by means of U-shaped clamps 69. The seat 67 may thus be elevated or lowered, or advanced toward or away from the saddle 10 as may be desired.

In lieu of the electric drive which I have described I may employ a gasoline engine drive which I have designated at 70 in Fig. 10. The gasoline engine may be mounted upon the top of saddle 10 and connected to shaft 71 to the transmission 34 from which shaft 38 extends to the transmission gearing within the box governed at 25 as heretofore described. Suitable radiator for maintaining the engine cool may be mounted as indicated at 72. Gas tank 73 may be carried by saddle 10. Power may be supplied to other parts of the gas engine system through belt 74.

The saddle construction is very readily manufactured and provides a simple means for mounting the parts of the tractor. While I have described my invention in certain preferred embodiments I desire that it be understood that I contemplate changes in arrangement of the parts of the tractor constituting my invention and I intend no limitations upon my invention other than are imposed by the scope of the appended claims.

What I claim as new and desire to secure by Letters Patent of the United States is as follows:

1. A tractor comprising a pair of side frame members, tractive means journaled in said side frame members, a saddle extending between said side frame members, said saddle including a horizontally disposed portion and downwardly depending side portions, said side portions being interconnected with said side frame members, driving means carried by the horizontally extending portion of said saddle, a system of gears supported by said saddle, means interconnecting said system of gears with the tractive means carried by each of said side frame members, and a control lever journaled in said saddle for differentially controlling the connection between said drive means and said tractive means.

2. A tractor including a pair of side frame members, tractive means journaled in said side frame members, a saddle comprising a sheet metal member having a horizontally disposed portion and a pair of vertically depending portions, connections between the vertical depending portions and said side frame members, laterally extending web members disposed beneath said saddle, brace members extending between said web members and said side frame members, driving means carried by said saddle, a system of gears supported from said saddle, and motion transmission means supported by the vertical depending portions of said saddle and inter-connecting said system of gears with said tractive means for imparting motion to said tractor.

3. A tractor comprising a pair of side frame members, tractive means carried by said side frame members, a saddle interconnecting said side frame members, said saddle having a horizontally disposed portion, a system of gears supported adjacent one end of said horizontally disposed portion, motion transmission mechanism carried by each side of said saddle and extending between said system of gears and said tractive means, drive means supported by said saddle, and means disposed adjacent one end of said saddle for differentially controlling the connection of said drive means through said system of gears with selective tractive means on said tractor.

4. A tractor comprising a pair of side frame members, tractive means carried by said side frame members, a saddle having a horizontally disposed portion and vertically disposed side portions, bracket members connecting opposite sides of said saddle with said side frame members, a gear system supported by one end of said saddle, a control lever journaled adjacent the opposite end of said saddle, motion transmission mechanism interconnecting said gear system with the tractive means carried by each of said side frame members, drive mechanism carried by the horizontally disposed portion of said saddle and connected with said gear system, and means interconnecting said control lever with said gear system for rendering said drive means effective to impart motion to either of said tractive means.

In testimony whereof I affix my signature.

WILLIAM F. WINSTEAD.